United States Patent
Zhang et al.

(10) Patent No.: US 9,585,526 B2
(45) Date of Patent: *Mar. 7, 2017

(54) PILOT VALVE SWITCH MECHANISM AND A SHOWER SYSTEM APPLIED WITH THE PILOT VALVE SWITCH MECHANISM

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Mingfu Zhang, Xiamen (CN); Lei Wang, Xiamen (CN); Xiaofeng Yang, Xiamen (CN); Huasong Zhou, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 16 days.

This patent is subject to a terminal disclaimer.

(21) Appl. No.: 14/168,180

(22) Filed: Jan. 30, 2014

(65) Prior Publication Data
US 2015/0090813 A1    Apr. 2, 2015

(30) Foreign Application Priority Data
Sep. 30, 2013   (CN) .......................... 2013 1 0462694

(51) Int. Cl.
*A47K 3/28*   (2006.01)
*F16K 31/124*  (2006.01)
(Continued)

(52) U.S. Cl.
CPC ............ *A47K 3/288* (2013.01); *E03C 1/0409* (2013.01); *F16K 11/07* (2013.01);
(Continued)

(58) Field of Classification Search
CPC ... B05B 1/1618; B05B 1/1627; B05B 1/1663; B05B 1/1681; B05B 1/18;
(Continued)

(56) References Cited

U.S. PATENT DOCUMENTS 4,616,671 A * 10/1986 Steinkuhl et al. ............ 137/101
6,371,150 B1 * 4/2002 Shimada .................. 137/119.03
(Continued)

*Primary Examiner* — Arthur O Hall
*Assistant Examiner* — Cody Lieuwen
(74) *Attorney, Agent, or Firm* — Rabin & Berdo, P.C.

(57) ABSTRACT

A pilot valve switch mechanism of a shower system includes a fixed portion and a valve spool. The fixed portion is has an inlet waterway, a first and second outlet waterway and a control hole that can connect to the outlet waterways. The first outlet waterway has a first outlet and the second outlet waterway has a second outlet. The valve spool is slidably assembled inside the fixed portion vertically to the inlet waterway, and has a slim hole connected to the inlet waterway. The valve spool and the fixed portion form a pressure cavity. The control hole and the slim hole are connected to the pressure cavity. The pressure cavity is controlled by the control hole to drive the valve spool to move along the inlet waterway to close the first or second outlet, switching the inlet waterway to connect to the first or second outlet waterway.

8 Claims, 12 Drawing Sheets

(51) Int. Cl.
*F16K 11/07* (2006.01)
*E03C 1/04* (2006.01)
*B05B 1/16* (2006.01)
*B05B 1/18* (2006.01)

(52) U.S. Cl.
CPC ........ *F16K 31/1245* (2013.01); *B05B 1/1663* (2013.01); *B05B 1/18* (2013.01); *Y10T 137/86582* (2015.04)

(58) Field of Classification Search
CPC ....... B05B 1/185; B05B 12/002; A47K 3/288; E03C 1/0408; E03C 1/0409; F16K 11/07; F16K 11/0716; F16K 31/122; F16K 31/1223; F16K 31/1226; F16K 31/1245; Y10T 137/86582
USPC ............... 239/442, 443, 447, 541, 569, 570; 137/118.02, 118.06, 119.01, 119.08; 251/25
See application file for complete search history.

(56) References Cited

U.S. PATENT DOCUMENTS

| | | | |
|---|---|---|---|
| 7,784,494 B2* | 8/2010 | Matsuzaki et al. | 137/625.69 |
| 2006/0138253 A1* | 6/2006 | Petrovic et al. | 239/446 |
| 2012/0012676 A1* | 1/2012 | Hu | 239/525 |
| 2012/0145252 A1* | 6/2012 | Hunnicutt | 137/14 |
| 2012/0205565 A1* | 8/2012 | Balmonet et al. | 251/25 |
| 2013/0291298 A1* | 11/2013 | Zhou et al. | 4/601 |

* cited by examiner

PILOT VALVE SWITCH MECHANISM AND A SHOWER SYSTEM APPLIED WITH THE PILOT VALVE SWITCH MECHANISM

FIELD OF THE INVENTION

The present invention relates to a pilot valve switch mechanism and a shower system applied with the pilot valve switch mechanism.

BACKGROUND OF THE INVENTION

The switch valve of a hand shower and a head shower of existing technology is usually applied with a method that the switch is realized by rotating a sealing element to plug the outlet hole, the water pressure is directly working to the sealing element, so that user has to operate hard, thus making it with bad switch handle.

SUMMARY OF THE INVENTION

The present invention is provided with a pilot valve switch mechanism and a shower system applied with the pilot valve switch mechanism, which overcome the disadvantages of the existing technology.

A first technical proposal of the present invention to solve the technical problem is as blow:

A pilot valve switch mechanism, wherein comprising:

a fixed portion comprising an inlet waterway (10), a first outlet waterway (20), a second outlet waterway (30) and a control hole (40) capable to connect to the outlet waterways (20, 30), the first outlet waterway (20) is disposed with a first outlet (21), the second outlet waterway (30) is disposed with a second outlet (31);

a valve spool (100) slidably assembled inside the fixed portion in the direction vertical to the inlet waterway (10), the valve spool (100) is disposed with a slim hole (110) connected to the inlet waterway (10), a pressure cavity (50) is formed between the valve spool (100) and a setting base (250), the control hole (40) and the slim hole (110) are connected to the pressure cavity (50); and a switch mechanism, the control hole (40) is open or closed by the switch mechanism to control the water pressure of the pressure cavity (50) to drive the valve spool (100) to move in the direction vertical to the inlet waterway (10) to alternately close the first outlet (21) and the second outlet (31), so that the inlet waterway (10) is switched to connect to the first outlet waterway (20) or the second outlet waterway (30).

In another preferred embodiment, the first outlet (21) and the second outlet (31) are spaced arranged up and down in the direction vertical to the inlet waterway (10), the slim hole (110) and the control hole (40) are spaced arranged up and down in the direction vertical to the inlet waterway (10), the diameter of the slim hole (110) is smaller than that of the control hole (40).

In another preferred embodiment, the valve spool (100) comprising a valve shaft (120) and a first protruding sealing ring (130) and a second protruding sealing ring (140) respectively disposed to close the first outlet (21) and the second outlet (31), the two protruding sealing rings are fixed to the valve shaft (120) and are spaced arranged along the length direction of the valve shaft (120), the space between the two protruding sealing rings is corresponding to the inlet waterway (10), the slim hole (110) runs through the second protruding sealing ring (140), the pressure cavity (70) is formed between the second protruding sealing ring (140) and the fixed portion.

In another preferred embodiment, the fixed portion comprising a valve housing and a first valve body (220) fixed to the valve housing, the inlet waterway (10), the two outlet waterways (20, 30) and the control hole are disposed in the valve housing, the first outlet waterway (20) is parallel to the inlet waterway (10), the first outlet (21) and the second outlet (31) are respectively disposed at the top (222) of the first valve body (220) and at the side (223) of the first valve body (220) and are respectively corresponding to the first outlet waterway (20) and the second outlet waterway (30), the first valve body (220) is further disposed with a water hole (221) connected to the second outlet and the inlet waterway (10), the valve spool (100) is slidably assembled inside the first valve body (220), the pressure cavity (70) is formed between the valve spool (100) and the first valve body (220) and the valve housing.

In another preferred embodiment, the fixed portion further comprising a fixed pipe (230) and an internal pipe (240), the fixed pipe (230) is fixed to the valve housing and is connected to the second outlet waterway (30), the internal pipe (240) is fixed to the valve housing inside the fixed pipe (230) and is connected to the control hole (40).

In another preferred embodiment, the switch mechanism is a button mechanism, which comprises a second valve body fixed to the fixed pipe, a switch shaft (320) and a ship button (330), the second valve body is disposed with a first pressure hole (311) connected to the internal pipe (240) and a first outlet path (312) connected to the fixed pipe (230), the switch shaft (320) is slidably assembled to the second valve body to close or open the first pressure hole (311), the ship button (330) is movably assembled to the second valve body and is connected to the switch shaft (320) in driving way.

In another preferred embodiment, the switch mechanism is a knob mechanism, which comprises a third valve body (410) fixed to the fixed pipe (230), a switch disk (420) with a sealing element (421) and a knob (430), the third valve body (410) is disposed with a second pressure hole (411) connected to the internal pipe (240) and a second outlet path (412) connected to the fixed pipe (230), the switch disk (420) is rotatably assembled inside the third valve body (410) and drives the sealing element (421) to close or open the second pressure hole (411), the knob (430) is rotatably assembled to the third valve body (410) and is connected to the switch disk (420) in driving way.

A second technical proposal of the present invention to solve the technical problem is as below:

A shower system applied with the pilot valve switch mechanism comprising a first outlet terminal, a second outlet terminal and a pilot valve switch mechanism, the first outlet terminal and the second outlet terminal are respectively disposed with a corresponding first outlet cavity and a corresponding second outlet cavity, the pilot valve switch mechanism is disposed in the first outlet terminal, the first outlet waterway and the second outlet waterway are respectively connected to the first outlet cavity and the second outlet cavity.

In another preferred embodiment, the first outlet terminal is a head shower (500), the second outlet terminal is a hand shower (600), the head shower (500) comprising a main section (510) and a supporting section (520), the first outlet cavity is disposed in the main section (510), the pilot valve switch mechanism is assembled to the supporting section (520).

Compared to the existing technology, the technical proposal of the present invention has advantages as below:

1. The work principle of the pilot valve switch mechanism is that:

Controlling the switch mechanism to open the control hole, as the diameter of the slim hole is smaller than that of the control hole, the water inside the pressure cavity discharging out of the control hole is larger than the water charging in from the slim hole, so that the water pressure inside the pressure cavity is small, as the area of the first pressed area is almost equal to that of the second pressed area, the water pressure of the first pressed area is far smaller than the water pressure of the second pressed area, although the third pressed area is pressed with same high pressure as the second pressed area, as it is small area, the pressure of the second pressed area holds a leading work, thus pushing the valve spool down in the direction vertical to the inlet waterway, meanwhile, the first protruding sealing ring closes the first outlet, the second protruding sealing ring opens the second outlet, water flows to the second outlet waterway from the inlet waterway through the water hole from the second outlet, then flows from the second outlet waterway to the fixed pipe through the first outlet path into the second outlet cavity, water flows out of the hand shower.

Controlling the switch mechanism to close the control hole, the pressure cavity can not discharge water out through the control hole, the pressure inside the pressure cavity is equal to the pressure outside, that is to say, the pressure of the first pressed area is similar to that of the second pressed area, they are balanced, as the third pressed area is pressed by more water pressure, the pressured of the third pressed area holds a leading work, thus pushing the valve spool up in the direction vertical to the inlet waterway, the first protruding sealing ring opens the first outlet, the second protruding sealing ring closes the second outlet, water flows out of the inlet waterway through the water hole to the first outlet into the first outlet path, then flows into the first outlet cavity from the first outlet waterway, water flows out of the head shower.

The pilot valve switch mechanism utilizes the on-off of the first pressure hole to control the control hole to open or close to switch the waterways from long distance, thus preventing the main pipe from great water pressure, the diameter of the control hole can be smaller, so that the water pressure of the button mechanism can be ignored, only friction and light elastic force of the spring exist, it is provided with small operation force and is stable, which enhance the switch handle feeling.

2. The fixed portion is disposed with a fixed pipe and an internal pipe, the internal pipe is connected to the control hole, the internal pipe extends the on-off control distance of the control hole, the fixed pipe extends the length of the second outlet waterway, so that the knob or the rotating mechanism can be disposed far away from the head shower and near to the user's hand, thus making it convenient to switch.

BRIEF DESCRIPTION OF THE DRAWINGS

The present invention will be further described with the drawings and the embodiments.

DETAILED DESCRIPTION OF THE EMBODIMENTS

Figure 1:
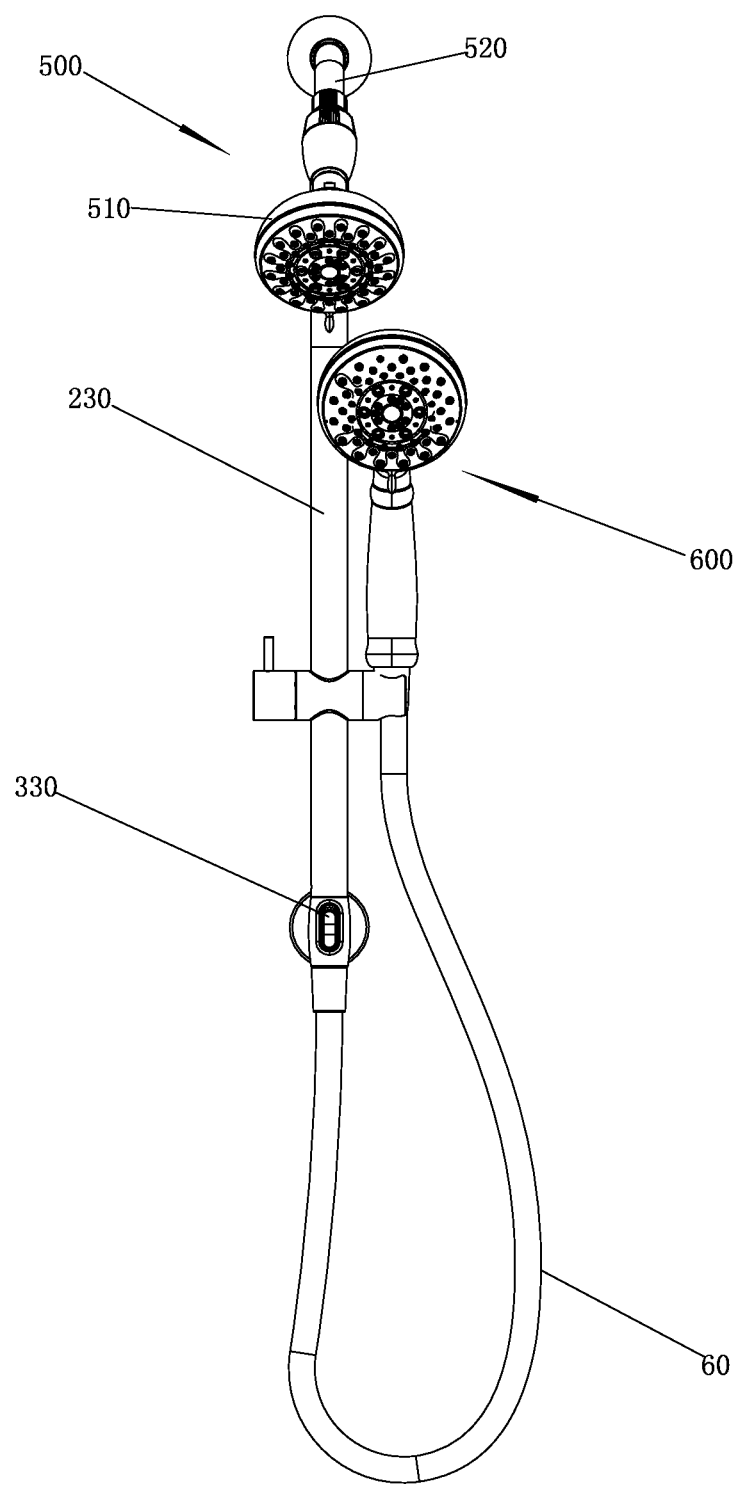
FIG. 1 illustrates a front view of a shower system of the first embodiment.
Figure 2:
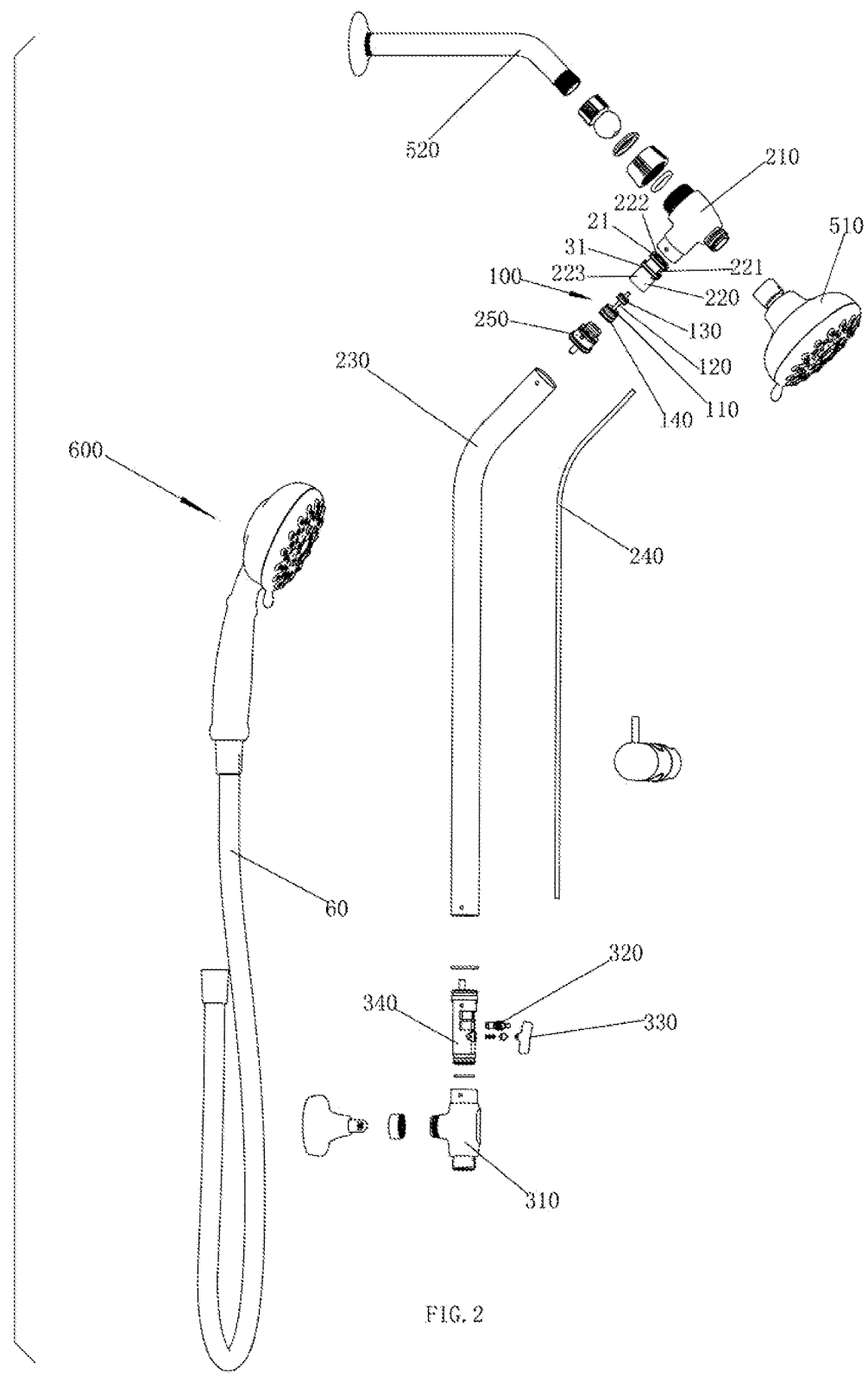
FIG. 2 illustrates an exploded diagram of a shower system of the first embodiment.

Please refer to FIG. 1 to FIG. 6, a shower system of the first embodiment is provided, the shower system comprises a first outlet terminal, a second outlet terminal and a pilot valve switch mechanism.

The first outlet terminal is disposed with a first outlet cavity corresponding to an outlet function, the pilot valve switch mechanism is applied in the first outlet terminal. In this embodiment, the first outlet terminal is a head shower 500, the head shower 500 comprising a main section 510 and a supporting section 520, the first outlet cavity is disposed in the main section 510, the pilot valve switch mechanism is assembled to the supporting section 520.

The second outlet terminal is disposed with a second outlet cavity corresponding to an outlet function. In this embodiment, the second outlet terminal is a side sprayer 600. The pilot valve switch mechanism comprising a fixed portion and a valve spool 100.

The fixed portion is disposed with an inlet waterway 10, a first outlet waterway 20, a second outlet waterway 30 and a control hole capable to connect to the outlet waterways 20, 30, the first outlet waterway 20 is disposed with a first outlet 21, the second outlet waterway 30 is disposed with a second outlet 31, the first outlet waterway and the second outlet waterway are respectively connected to the first outlet cavity and the second outlet cavity. In this embodiment, the first outlet 21 and the second outlet 31 are spaced arranged up and down in the direction vertical to the inlet waterway 10.

In this embodiment, the fixed portion comprising a valve housing and a first valve body 220 fixed inside the valve housing.

The valve housing comprising an upper valve housing 210 and a setting base 250 fixed below the upper valve housing. The inlet waterway 10 and the two outlet waterways 20, 30 are disposed in the upper valve housing 210, the control hole 40 is disposed in the setting base 250, the first outlet waterway 20 is parallel to the inlet waterway 10.

The first valve body 220 is hollow and the top portion and side wall thereof are respectively disposed with the first outlet 21 and the second outlet 31, the first outlet 21 and the second outlet 31 are respectively corresponding to the first outlet waterway 20 and the second outlet waterway 30. The side wall 223 of the first valve body 220 is further disposed with a water hole 221 connected to the two outlets and the inlet waterway 10, the water hole 221 is between the first outlet 21 and the second outlet 31.

In this embodiment, the fixed portion is further disposed with a fixed pipe 230 and an internal pipe 240, the fixed pipe 230 is fixed to the setting base 250 and is connected to the second outlet waterway 30, the internal pipe 240 is fixed to the setting base 250 inside the fixed pipe 230 and is connected to the control hole 40 correspondingly, the internal pipe extends the on-off control distance of the control hole, the fixed pipe extends the length of the second outlet waterway, so that the knob or the rotating mechanism can be disposed far away from the head shower, thus making it convenient to switch.

The valve spool 100 is slidably assembled inside the fixed portion in the direction vertical to the inlet waterway 10, the valve spool 100 is disposed with a slim hole 110 connected to the inlet waterway 10, a pressure cavity 50 is formed between the valve spool 100 and the fixed portion, the control hole 40 and the slim hole 110 are connected to the pressure cavity 50; in this embodiment, the valve spool 100 is slidably assembled inside the first valve body 220, the valve spool 100, the first valve body 220 and the setting base 250 form the pressure cavity 50. in this embodiment, the slim hole 110 and the control hole 40 are spaced arranged up and down in the direction vertical to the inlet waterway 10, and the diameter of the slim hole 110 is smaller than that of the control hole 40.

By opening or closing the control hole 40, the water pressure of the pressure cavity 50 is controlled to drive the valve spool 100 to move in the direction vertical to the inlet waterway 10 to alternately close the first outlet 21 and the second outlet 31, so that the inlet waterway 10 is switched to connect to the first outlet waterway 20 or the second outlet waterway 30.

In this embodiment, the valve spool 100 is disposed with a valve shaft 120 and a first protruding sealing ring 130 and a second protruding sealing ring 140 to respectively close the first outlet 21 and the second outlet 31, two protruding sealing rings are fixed to the valve shaft 120 and are spaced arranged along the length direction of the valve shaft 120, the space between the two protruding sealing rings are corresponding to the water hole 221, the slim hole 110 runs through the second protruding sealing ring 140, the pressure cavity 50 is formed between the second protruding sealing ring 140, the first valve body 220 and the setting base 250.

In this embodiment, the pilot valve switch mechanism further comprising a button mechanism, the button mechanism comprising a second valve body fixed to the fixed pipe 230, a switch shaft 320 and a ship button 330.

The second valve body comprising an external valve body 310 fixed to the fixed pipe 230 and an internal valve body 340 sleeved inside the external valve body 310. the internal valve body 340 is disposed with a first pressure hole 311 connected to the internal pipe 240 and a first outlet path 312 connected to the fixed pipe 230, the switch shaft 320 is slidably assembled to the internal valve body 340 to close or open the first pressure hole 311, the ship button 330 is movably assembled to the second valve body and is connected to the switch shaft 320 in driving way. The second outlet cavity of the hand shower is connected to the first outlet path 312 by a flexible pipe 60.

The first pressure hole 311 is connected to the control hole, closing or opening the first pressure hole 311 is to close or open the control hole, closing or opening the first pressure hole 311 by the button mechanism can control to close or open the control hole. Preferred, the diameter of the first pressure hole 31 is equal to that of the control hole, so that the pilot valve can normally work.

Figure 5:
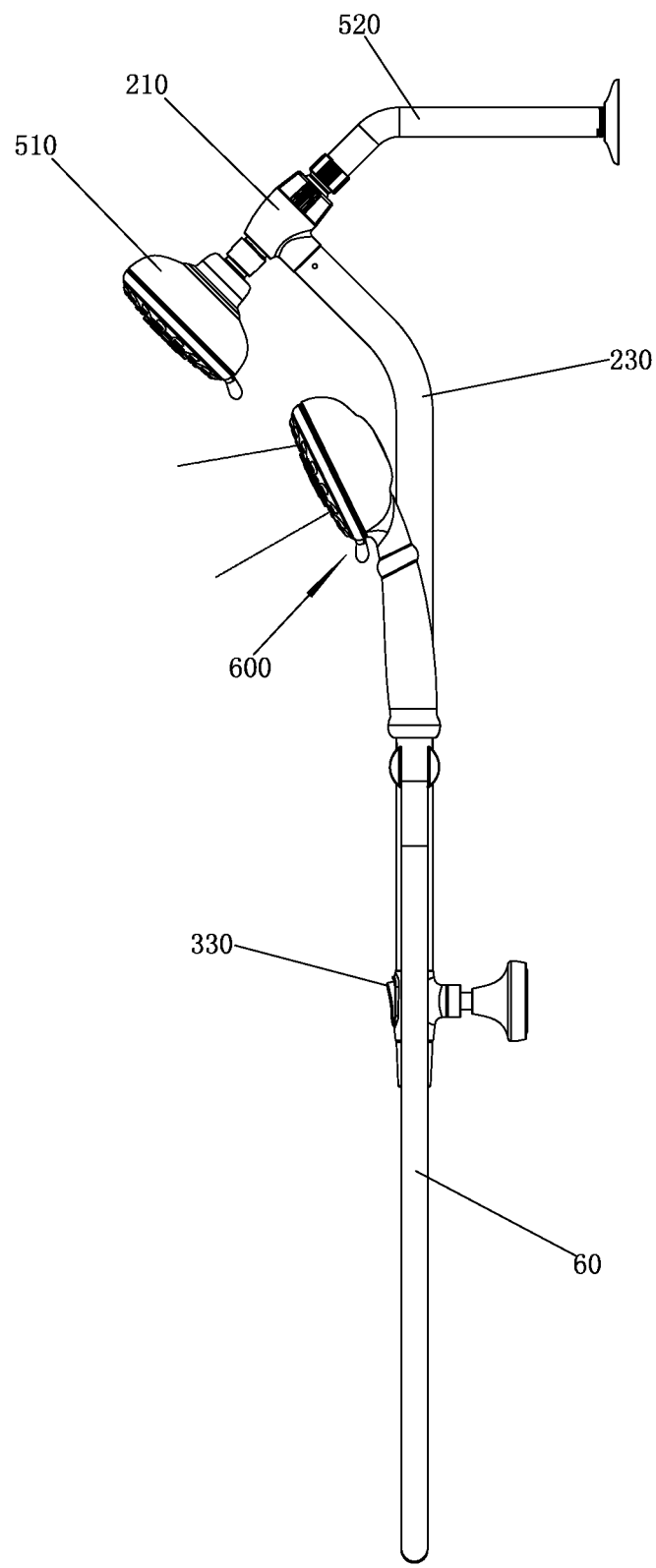
FIG. 5 illustrates a side view of a shower system of the first embodiment when water flows out of the hand shower.
Figure 6:
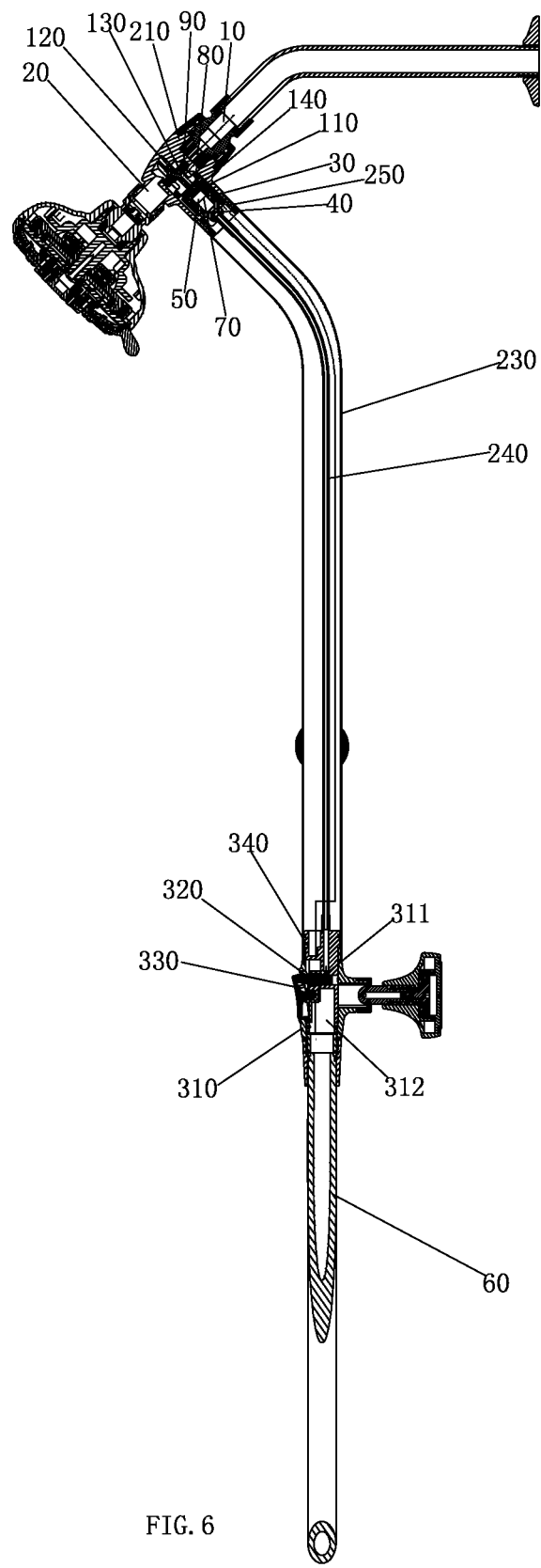
FIG. 6 illustrates a sectional view of FIG. 5.
Figure 7:
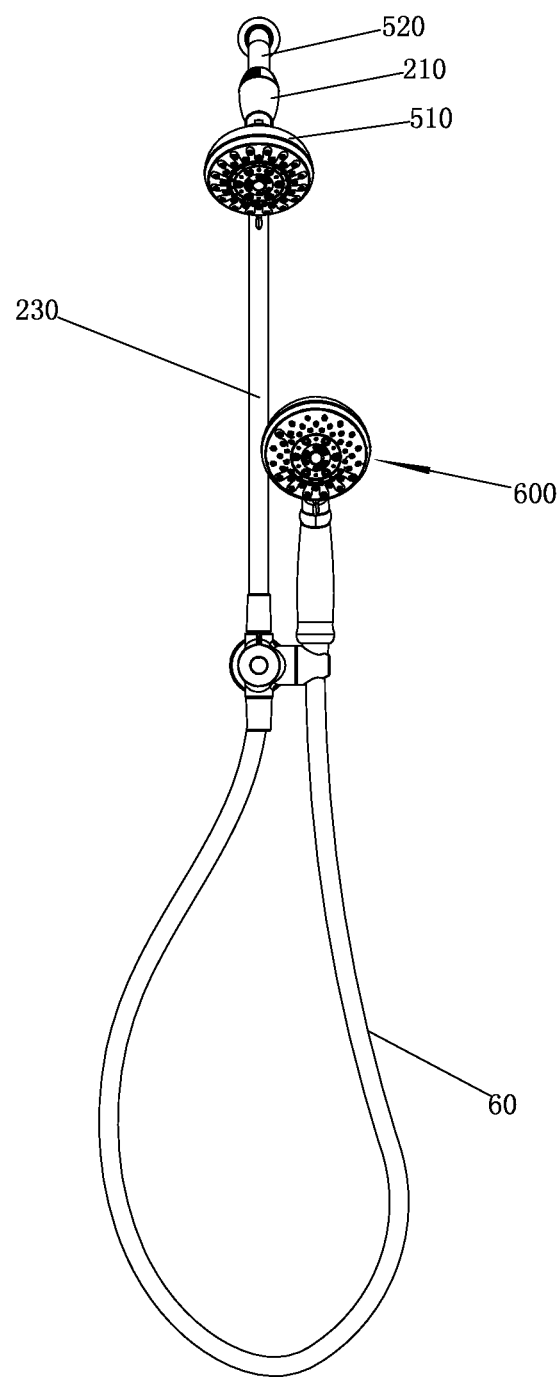
FIG. 7 illustrates a front view of a shower system of the second embodiment.
Figure 8:
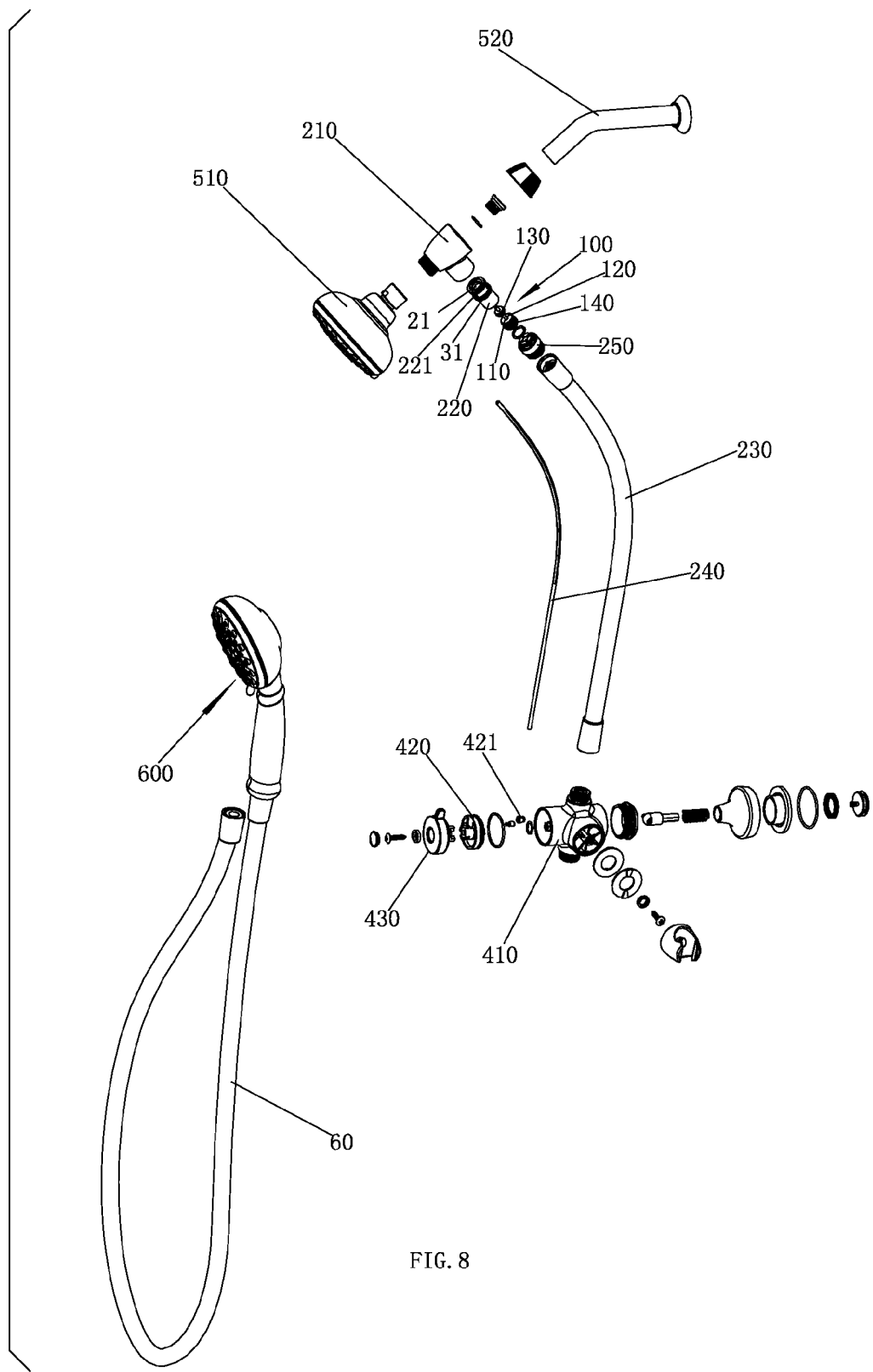
FIG. 8 illustrates an exploded diagram of a shower system of the second embodiment.
Figure 9:
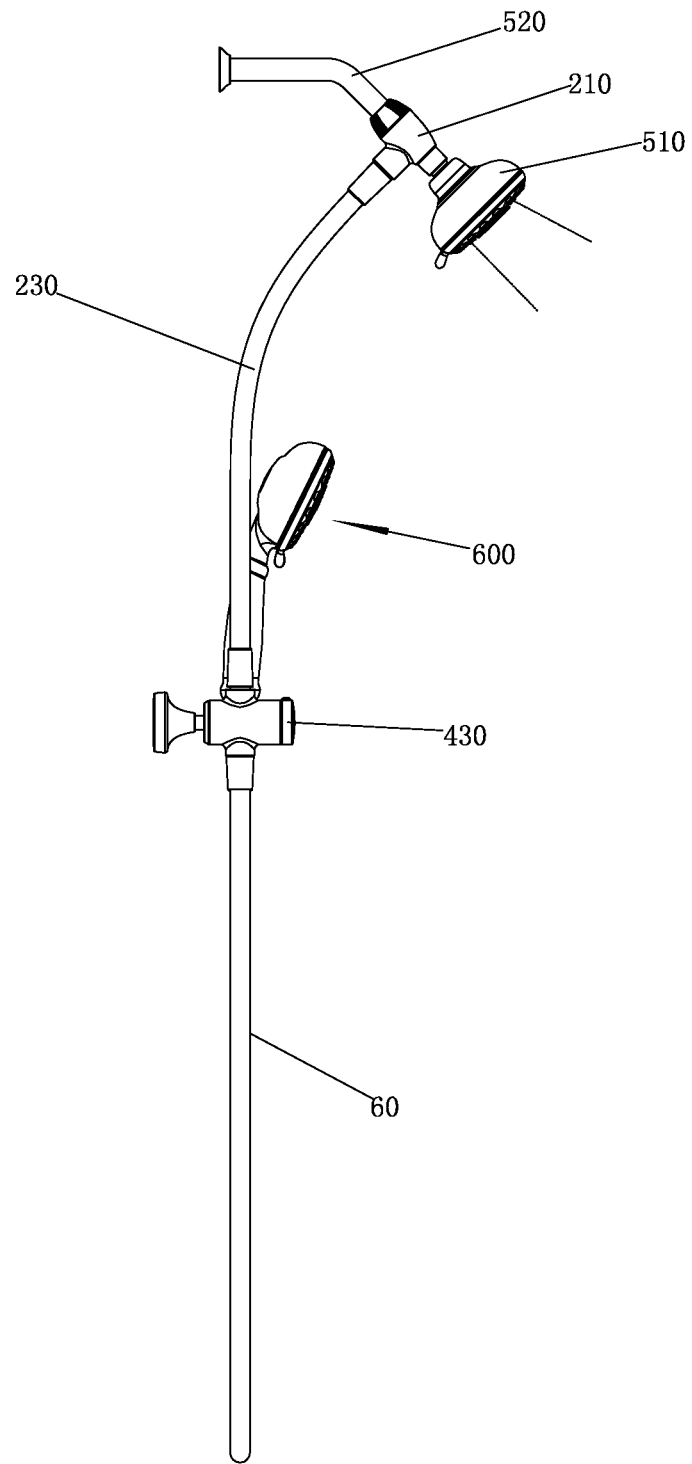
FIG. 9 illustrates a side view of a shower system of the second embodiment when water flows out of the head shower.
Figure 10:
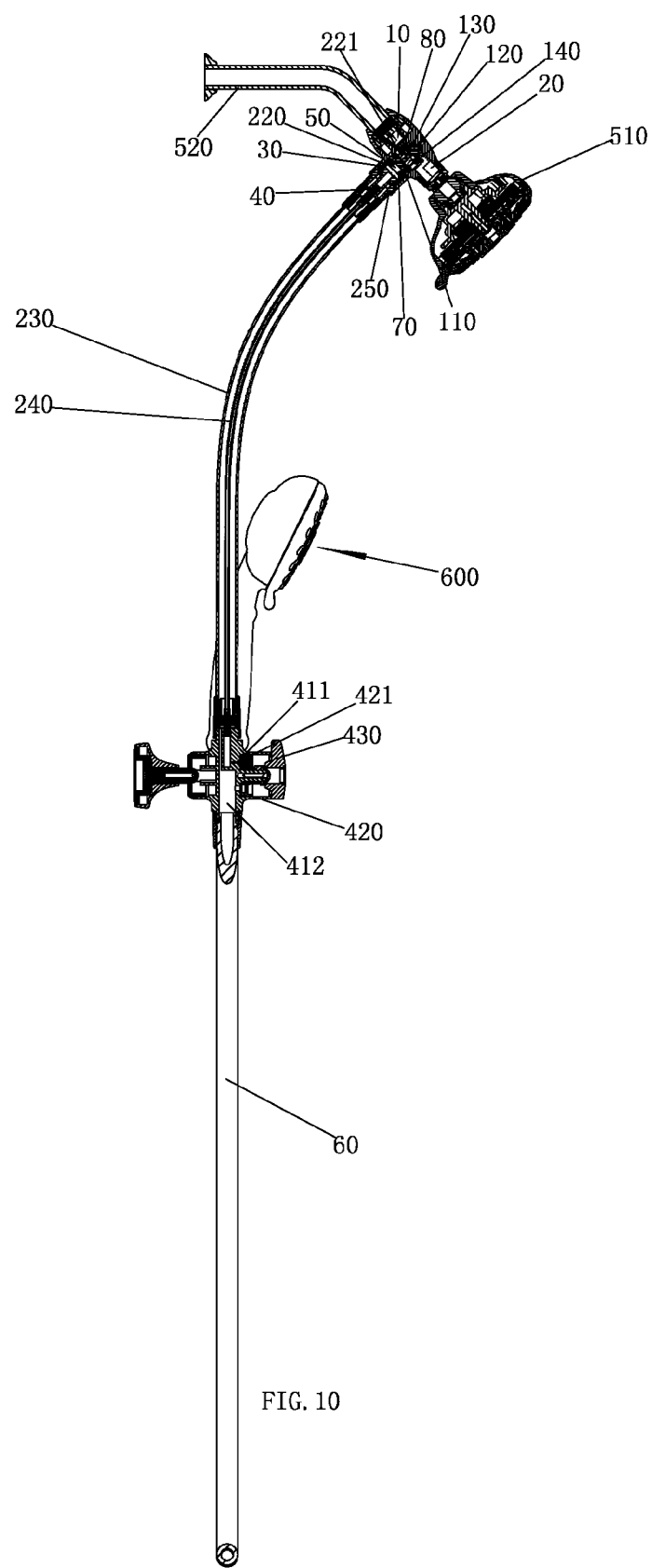
FIG. 10 illustrates a sectional view of FIG. 9.
Figure 11:
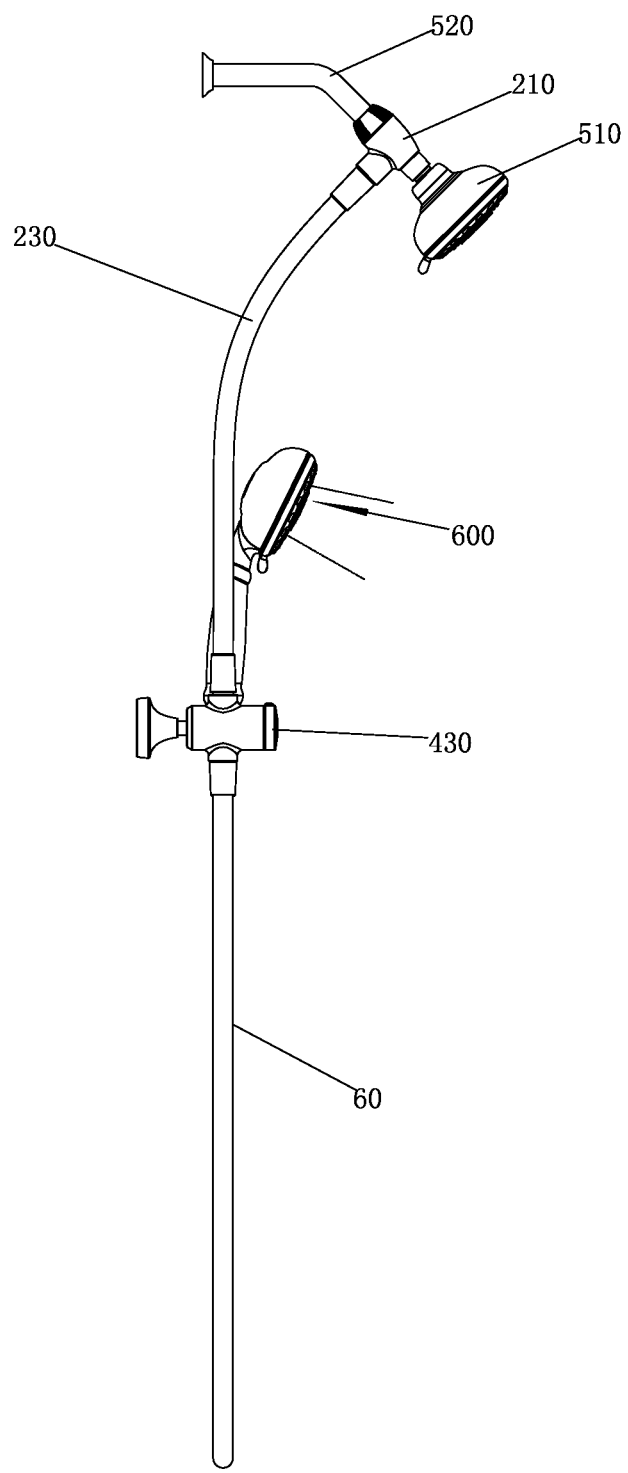
FIG. 11 illustrates a side view of a shower system of the second embodiment when water flows out of the hand shower.
Figure 12:
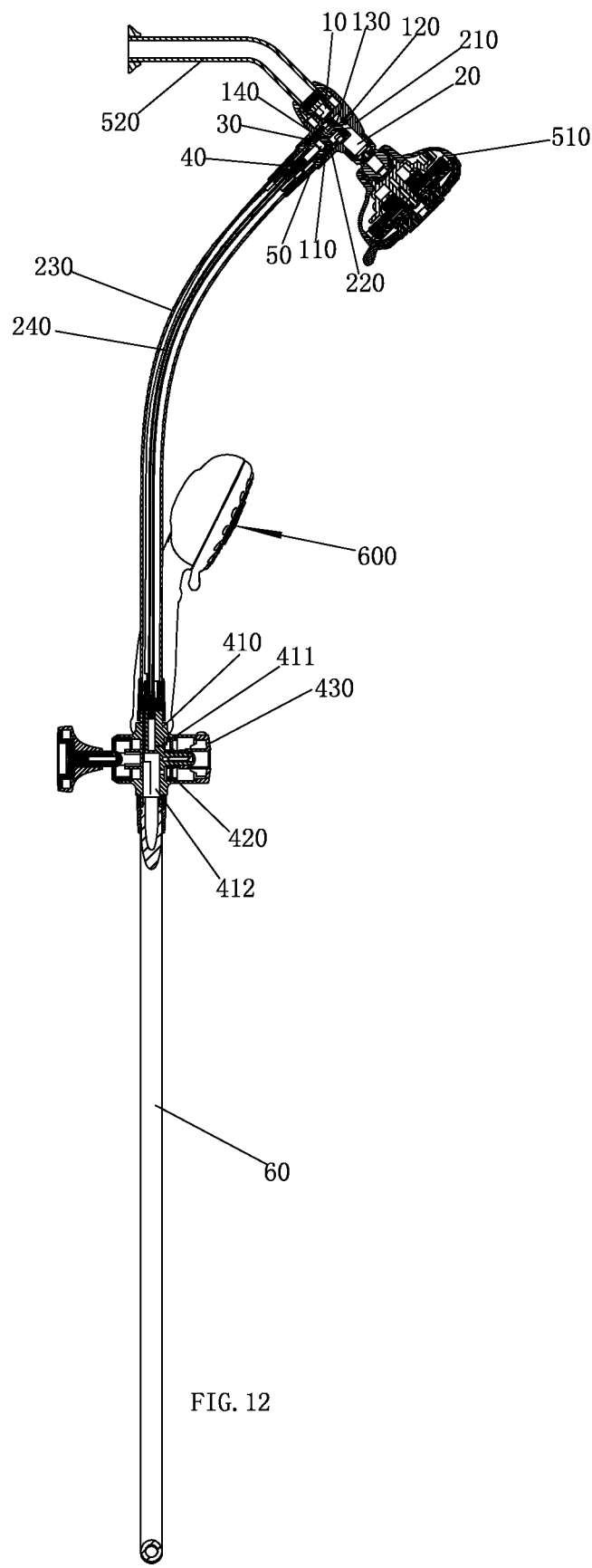
FIG. 12 illustrates a sectional view of FIG. 11.

The work principle of the shower system is as below:

As figured in FIG. 5 and FIG. 6, pressing the ship button 330 to drive the switch shaft 320 to slide to open the first pressure hole 311, that is to say, the control hole 40 is open, as the diameter of the slim hole 110 is smaller than that of the control hole 40, the water inside the pressure cavity 50 discharging out of the control hole 40 is larger than the water charging in from the slim hole 110, so that the water pressure inside the pressure cavity 50 is small, as the area of the first pressed area 70 is almost equal to that of the second pressed area 80, the water pressure of the first pressed area 90 is far smaller than the water pressure of the second pressed area 80, although the third pressed area 70 is pressed with same high pressure as the second pressed area 80, as it is small area, the pressure of the second pressed area 80 holds a leading work, thus pushing the valve spool 100 down in the direction vertical to the inlet waterway, meanwhile, the first protruding sealing ring 130 closes the first outlet 21, the second protruding sealing ring 140 opens the second outlet 31, water flows to the second outlet waterway from the inlet waterway 10 through the water hole 221 from the second outlet 31, then flows from the second outlet waterway 30 to the fixed pipe 230 through the first outlet path 312 into the second outlet cavity, water flows out of the hand shower 600.

Figure 3:
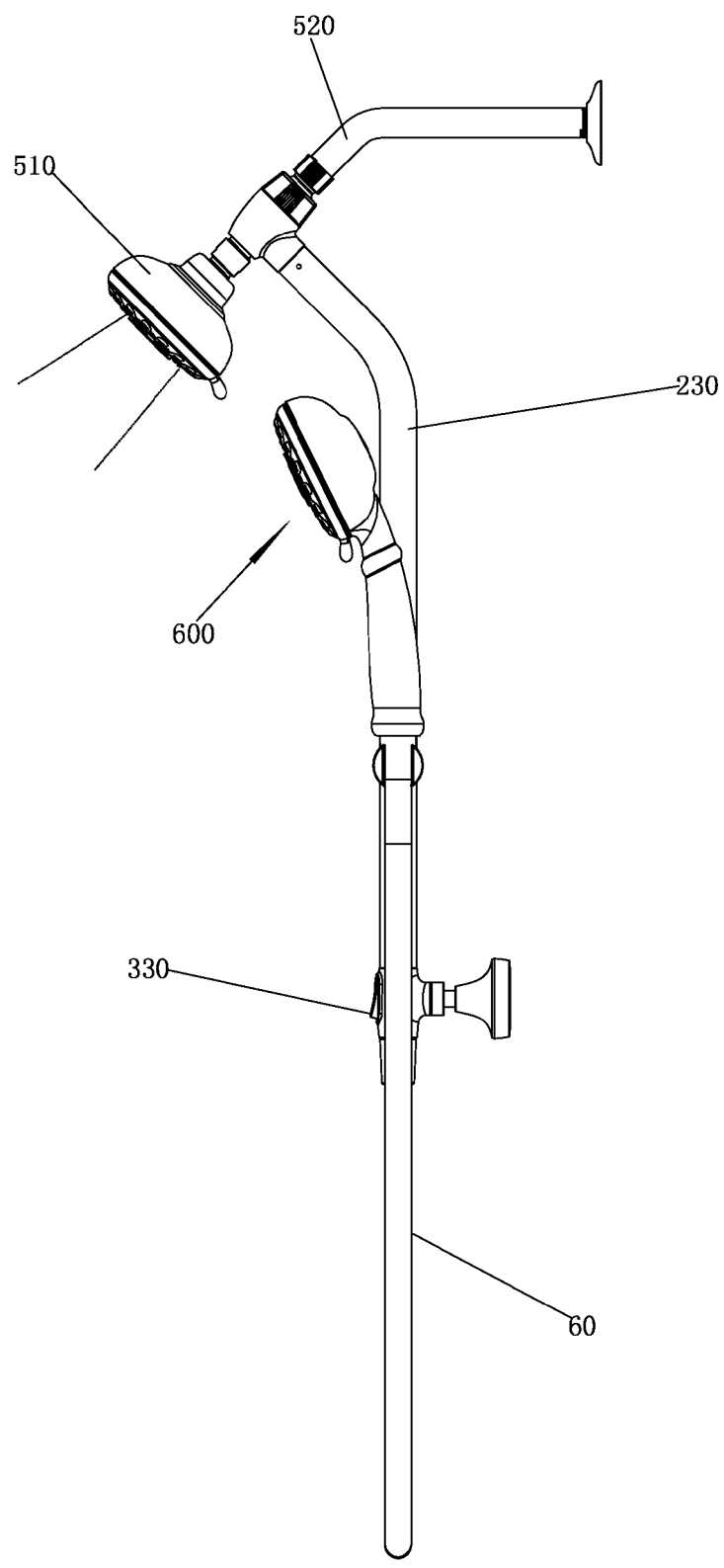
FIG. 3 illustrates a side view of a shower system of the first embodiment when water flows out of the head shower.
Figure 4:
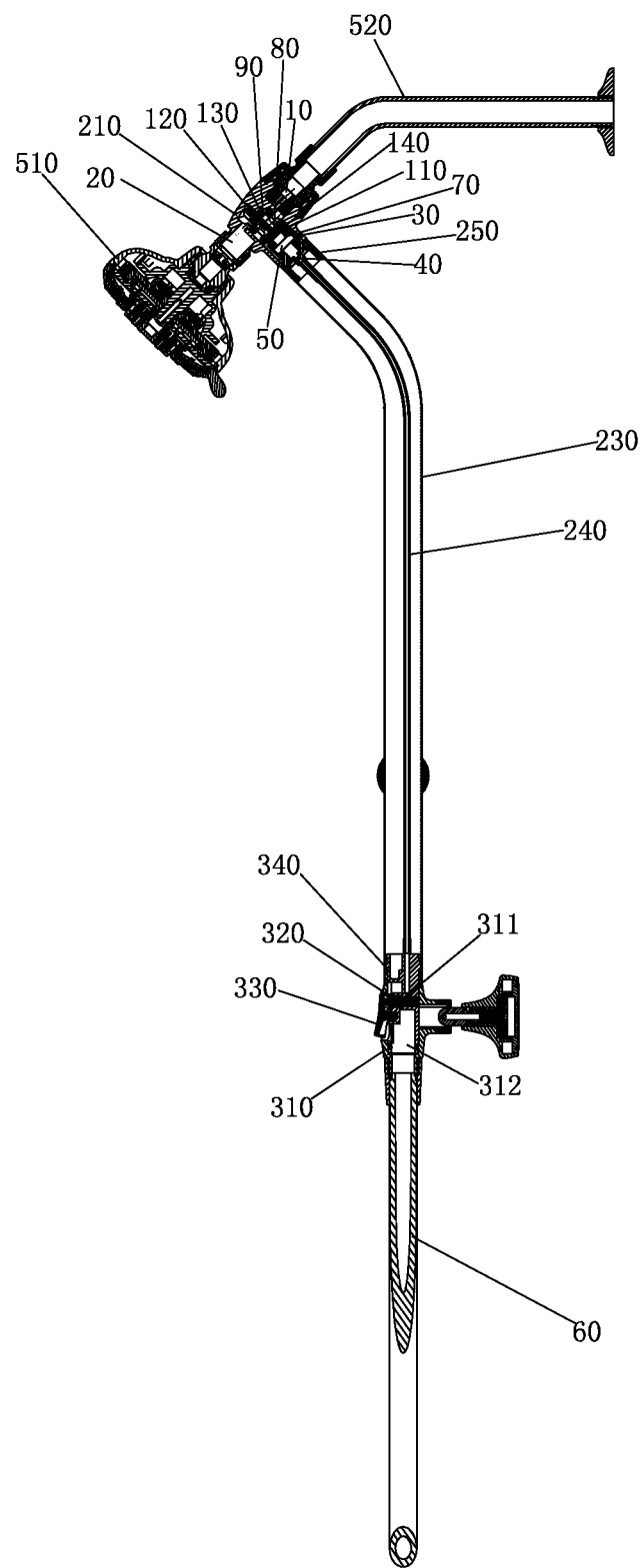
FIG. 4 illustrates a sectional view of FIG. 3.

As figured in FIG. 3 and FIG. 4, pressing the ship button 330 to drive the switch shaft 320 to slide to close the first pressure hole 311, that is to say, the control hole 40 is closed, the pressure cavity 50 can not discharge water out through the control hole 40, the pressure inside the pressure cavity 50 is equal to the pressure outside, that is to say, the pressure of the first pressed area 70 is similar to that of the second pressed area 80, they are balanced, as the third pressed area 90 is pressed by more water pressure, the pressured of the third pressed area 90 holds a leading work, thus pushing the valve spool 100 up in the direction vertical to the inlet waterway 10, the first protruding sealing ring 130 opens the first outlet 21, the second protruding sealing ring 140 closes the second outlet 31, water flows out of the inlet waterway 10 through the water hole 221 to the first outlet 21 into the first outlet waterway 20, then flows into the first outlet cavity from the first outlet waterway 20, water flows out of the head shower 500.

The pilot valve switch mechanism utilizes the on-off of the first pressure hole to control the control hole to open or close to switch the waterways from long distance, thus preventing the main pipe from great water pressure, the diameter of the control hole can be smaller, so that the water pressure of the button mechanism can be ignored, only friction and light elastic force of the spring exist, it is provided with small operation force and is stable, which enhance the switch handle feeling.

In other case, the fixed portion can be disposed without the fixed pipe 230 and the internal pipe 240, the button mechanism is directly controlled to open or close the control hole 40 to switch the waterways.

Please refer to FIG. 7 to FIG. 12, a second preferred embodiment of a shower system is provided. The difference of the second embodiment from above one is that the button mechanism is changed to be a knob mechanism.

The knob mechanism comprises a third valve body 410 fixed to the fixed pipe 230, a switch disk 420 with a sealing element 421 and a knob 430, the third valve body 410 is disposed with a second pressure hole 411 connected to the internal pipe 240 and a second outlet path 412 connected to the fixed pipe 230, the switch disk 420 is rotatably assembled inside the third valve body 410 and drives the sealing element 421 to close or open the second pressure hole 411, the knob 430 is rotatably assembled to the third valve body 410 and is connected to the switch disk 420 in driving way. In the same way, the second pressure hole 411 is connected to the control hole 40, closing or opening the second pressure hole 411 is to close or open the control hole, closing or opening the second pressure hole 411 by the knob mechanism can control to close or open the control hole.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A pilot valve switch mechanism, wherein comprising:
   a fixed portion comprising
      an inlet waterway (10),
      a first outlet waterway (20),
      a second outlet waterway (30) and
      a control hole (40) capable to connect to the outlet waterways (20, 30),
   the first outlet waterway (20) is disposed with a first outlet (21),
   the second outlet waterway (30) is disposed with a second outlet (31);
   a valve spool (100) slidably assembled inside the fixed portion in an axial direction to the inlet waterway (10),
   the valve spool (100) is disposed with a slim hole (110) connected to the inlet waterway (10),
   a pressure cavity (50) is formed between the valve spool (100) and a setting base (250),
   the control hole (40) and the slim hole (110) are connected to the pressure cavity (50); and
   the control hole (40) is opened or closed to control a water pressure of the pressure cavity (50) to drive the valve spool (100) to move in a vertically upward direction relative to the inlet waterway (10) to alternately close the first outlet (21) and the second outlet (31), so that the inlet waterway (10) is switched to connect to the first outlet waterway (20) or the second outlet waterway (30), wherein
   the fixed portion further comprising a valve housing, a fixed pipe (230) and an internal pipe (240),
   the fixed pipe (230) surrounds the internal pipe (240),
   the fixed pipe (230) is fixed to the valve housing and is connected to the second outlet waterway (30),
   the internal pipe (240) is fixed to the valve housing inside the fixed pipe (230) and is connected to the control hole (40).

2. The pilot valve switch mechanism according to claim 1, wherein
   the first outlet (21) and the second outlet (31) are spaced apart from each other along a direction normal to the inlet waterway (10),
   the slim hole (110) and the control hole (40) are spaced apart from each other along a direction normal to the inlet waterway (10),
   the diameter of the slim hole (110) is smaller than that of the control hole (40).

3. The pilot valve switch mechanism according to claim 1, wherein
   the valve spool (100) comprising a valve shaft (120) and a first protruding sealing ring (130) and a second protruding sealing ring (140) respectively disposed to close the first outlet (21) and the second outlet (31),
   the two protruding sealing rings are fixed to the valve shaft (120) and are spaced and arranged along the length direction of the valve shaft (120),
   the space between the two protruding sealing rings is corresponding to the inlet waterway (10),
   the slim hole (110) runs through the second protruding sealing ring (140),
   the pressure cavity (70) is formed between the second protruding sealing ring (140) and the fixed portion.

4. The pilot valve switch mechanism according to claim 1, wherein
   the fixed portion comprising a first valve body (220) fixed to the valve housing,
   the inlet waterway (10), the two outlet waterways (20, 30) and the control hole are disposed in the valve housing,
   the first outlet waterway (20) is parallel to the inlet waterway (10),
   the first outlet (21) and the second outlet (31) are respectively disposed at a top of the first valve body (220) and at a side of the first valve body (220) and are respectively corresponding to the first outlet waterway (20) and the second outlet waterway (30),
   the first valve body (220) is further disposed with a water hole (221) connected to the second outlet and the inlet waterway (10),
   the valve spool (100) is slidably assembled inside the first valve body (220),
   the pressure cavity (70) is formed between the valve spool (100) and the first valve body (220) and the valve housing.

5. The pilot valve switch mechanism according to claim 1, wherein
   the switch mechanism is a button mechanism, which comprises
      a second valve body fixed to the fixed pipe,
      a switch shaft (320) and
      a ship button (330),
   the second valve body is disposed with a first pressure hole (311) connected to the internal pipe (240) and a first outlet path (312) connected to the fixed pipe (230),
   the switch shaft (320) is slidably assembled to the second valve body to close or open the first pressure hole (311),
   the ship button (330) is movably assembled to the second valve body and is connected to drive the switch shaft (320).

6. The pilot valve switch mechanism according to claim 1, wherein
   the switch mechanism is a knob mechanism, which comprises
      a third valve body (410) fixed to the fixed pipe (230),
      a switch disk (420) with a sealing element (421) and
      a knob (430),
   the third valve body (410) is disposed with a second pressure hole (411) connected to the internal pipe (240) and a second outlet path (412) connected to the fixed pipe (230),
   the switch disk (420) is rotatably assembled inside the third valve body (410) and drives the sealing element (421) to close or open the second pressure hole (411),
   the knob (430) is rotatably assembled to the third valve body (410) and is connected to drive the switch disk (420).

7. A shower system applied with the pilot valve switch mechanism according to claim 1, wherein comprising
   a first outlet terminal,
   a second outlet terminal and
   the pilot valve switch mechanism,
   the first outlet terminal and the second outlet terminal are respectively disposed with a corresponding first outlet cavity and a corresponding second outlet cavity, the pilot valve switch mechanism is disposed in the first outlet terminal, the first outlet waterway and the second outlet waterway are respectively connected to the first outlet cavity and the second outlet cavity.

8. The shower system applied with the pilot valve switch mechanism according to claim 7, wherein the first outlet terminal is a head shower (500), the second outlet terminal is a hand shower (600), the head shower (500) comprising a main section (510) and a supporting section (520), the first outlet cavity is disposed in the main section (510), the pilot valve switch mechanism is assembled to the supporting section (520).

* * * * *